(12) United States Patent
Dunsky (10) Patent No.: US 9,697,736 B2
(45) Date of Patent: Jul. 4, 2017

(54) TRACKING OF SUSPECT AIRCRAFT

(75) Inventor: Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 594 days.

(21) Appl. No.: 12/816,867

(22) Filed: Jun. 16, 2010

(65) Prior Publication Data

US 2011/0144897 A1   Jun. 16, 2011

Related U.S. Application Data

(60) Provisional application No. 61/187,490, filed on Jun. 16, 2009.

(51) Int. Cl.
| | |
|---|---|
| *G01C 21/00* | (2006.01) |
| *G08G 5/00* | (2006.01) |
| *G01C 21/30* | (2006.01) |

(52) U.S. Cl.
CPC .............. *G08G 5/00* (2013.01); *G01C 21/30* (2013.01)

(58) Field of Classification Search
CPC .............................. G08G 5/0039; G01C 21/30
USPC .... 701/120, 122, 14, 26, 411, 416, 417, 442
See application file for complete search history.

(56) References Cited

U.S. PATENT DOCUMENTS

| | | | | |
|---|---|---|---|---|
| 7,026,956 B1 * | 4/2006 | Wenger | .................. | G01C 23/00 340/971 |
| 7,702,427 B1 * | 4/2010 | Sridhar | .................. | G08G 5/045 701/14 |
| 8,362,925 B2 * | 1/2013 | Brinkman et al. | ............ | 340/961 |
| 2003/0193410 A1 * | 10/2003 | Chen | .................... | G01C 23/005 340/971 |
| 2004/0148067 A1 * | 7/2004 | Griffith et al. | ..................... | 701/3 |
| 2004/0236554 A1 * | 11/2004 | Raghavan | ............... | A61M 5/14 703/11 |
| 2006/0224318 A1 * | 10/2006 | Wilson et al. | ................. | 701/213 |
| 2007/0069922 A1 * | 3/2007 | Cole et al. | ..................... | 340/971 |
| 2008/0195309 A1 * | 8/2008 | Prinzel, III et al. | .......... | 701/208 |
| 2009/0005960 A1 * | 1/2009 | Roberts et al. | ............... | 701/120 |
| 2009/0319100 A1 * | 12/2009 | Kale et al. | ........................ | 701/4 |

* cited by examiner

*Primary Examiner* — Hunter Wilder
(74) *Attorney, Agent, or Firm* — Fay Kaplun & Marcin, LLP (57) ABSTRACT

Described herein are systems and methods for tracking suspect aircraft. One embodiment is related to a method including receiving location data and current flight data of an aircraft, analyzing the location data and current flight data using flight behavior algorithms, detecting route deviation of the aircraft, and providing a report of flight pattern analysis and the detected route deviation to at least one device on a network. Another embodiment is related to a system comprising a location network determining location data of an aircraft, a searchable database storing historical flight activity data, current flight data, and the location data from the location network, a flight tracking module receiving location data and the current flight data of the aircraft from the database, analyzing the location data and current flight data using flight behavior algorithms, detecting route deviation of the aircraft based on the historical flight activity data, and providing a report of flight pattern analysis and the detected route deviation to at least one device on a network.

17 Claims, 8 Drawing Sheets

FIG. 7 — Airport-Reporting Tool 700

TRACKING OF SUSPECT AIRCRAFT

PRIORITY CLAIM/INCORPORATION BY REFERENCE

The present application claims priority to U.S. Provisional Patent Application 61/187,490 filed on Jun. 16, 2009 entitled "Tracking of Suspect Aircraft" naming Ron Dunsky as inventor, and hereby incorporates, by reference, the entire subject matter of the Provisional Application.

BACKGROUND

The tracking of aviation flights is an activity performed by airports, airlines, governmental agencies (e.g., Federal Aviation Administration, or "FAA"), etc. Flight tracking gathers flight information in order to know whether a flight has safely landed and to know whether a flight goes according to the schedule. Tracking is not limited to aircraft activity, it can include tracking of airport activity. The importance of flight/airline tracking has been growing in recent years due to reasons such as, but not limited to, security concerns, safety concerns, drug/illegal substance trafficking, etc.

An air traffic monitoring system may enable an airport to provide a variety of information and generate an efficient handling of incoming and outgoing aircraft, in particular when the air traffic monitoring system is configured with real time data. However, conventional air traffic monitoring systems are not equipped with an ability for generating an alert to a presence of an aircraft that remains grounded for extended periods. For example, a taxiing aircraft may be held up for an extended time until a window becomes available for the aircraft to leave.

SUMMARY OF THE INVENTION

Described herein are systems and methods for tracking suspect aircraft. One embodiment of the disclosure of this application is related to a method including receiving location data and current flight data of an aircraft, analyzing the location data and current flight data using flight behavior algorithms, detecting route deviation of the aircraft, and providing a report of flight pattern analysis and the detected route deviation to at least one device on a network.

Another embodiment of the disclosure of this application is related to a system comprising a location network determining location data of an aircraft, a searchable database storing historical flight activity data, current flight data, and the location data from the location network, a flight tracking module receiving location data and the current flight data of the aircraft from the database, analyzing the location data and current flight data using flight behavior algorithms, detecting route deviation of the aircraft based on the historical flight activity data, and providing a report of flight pattern analysis and the detected route deviation to at least one device on a network.

A further embodiment of the disclosure of this application is related to a non-transitory computer readable storage medium including a set of instructions for tracking aircraft, executable by a processor. Specifically, the set of instructions for tracking aircraft is operable to receive location data and current flight data of an aircraft from a location network, analyze the location data and current flight data using flight behavior algorithms, detect route deviation of the aircraft, and provide a report of flight pattern analysis and the detected route deviation to at least one device on a network.

DETAILED DESCRIPTION

The exemplary embodiments may be further understood with reference to the following description and the appended drawings, wherein like elements are referred to with the same reference numerals. The exemplary embodiments describe systems and methods for tracking a suspect aircraft. The exemplary embodiments described herein may enhance the success rate of suspect aircraft interdiction. Specifically, the systems and methods may track suspect aircrafts through the use of various sources of information, such as alerts of pending flight activity, accurate aircraft arrival predictions, precise aircraft location and route deviation information, a more complete capture of all suspect aircraft, as well as the ability to discern suspect pattern of activity.

As will be described in greater detail below, the exemplary systems and methods for tracking suspect aircrafts may utilize one or more databases storing both live flight information (e.g., "real-time" flight data) and historical flight information. Specifically, the exemplary database may be supplied with flight information through various radar networks. Accordingly, the databases may enhance the interdiction success rate of suspect aircrafts through an alert module.

The tracking and alerting modules provide an interface that incorporates aircraft traffic data to generate alerts and other pertinent derived data from the tracked aircraft traffic data. The database, the alerts module, the interface, the aircraft traffic data, the radar networks, and the derived airport and flight information will be discussed in further detail below.

Figure 1:
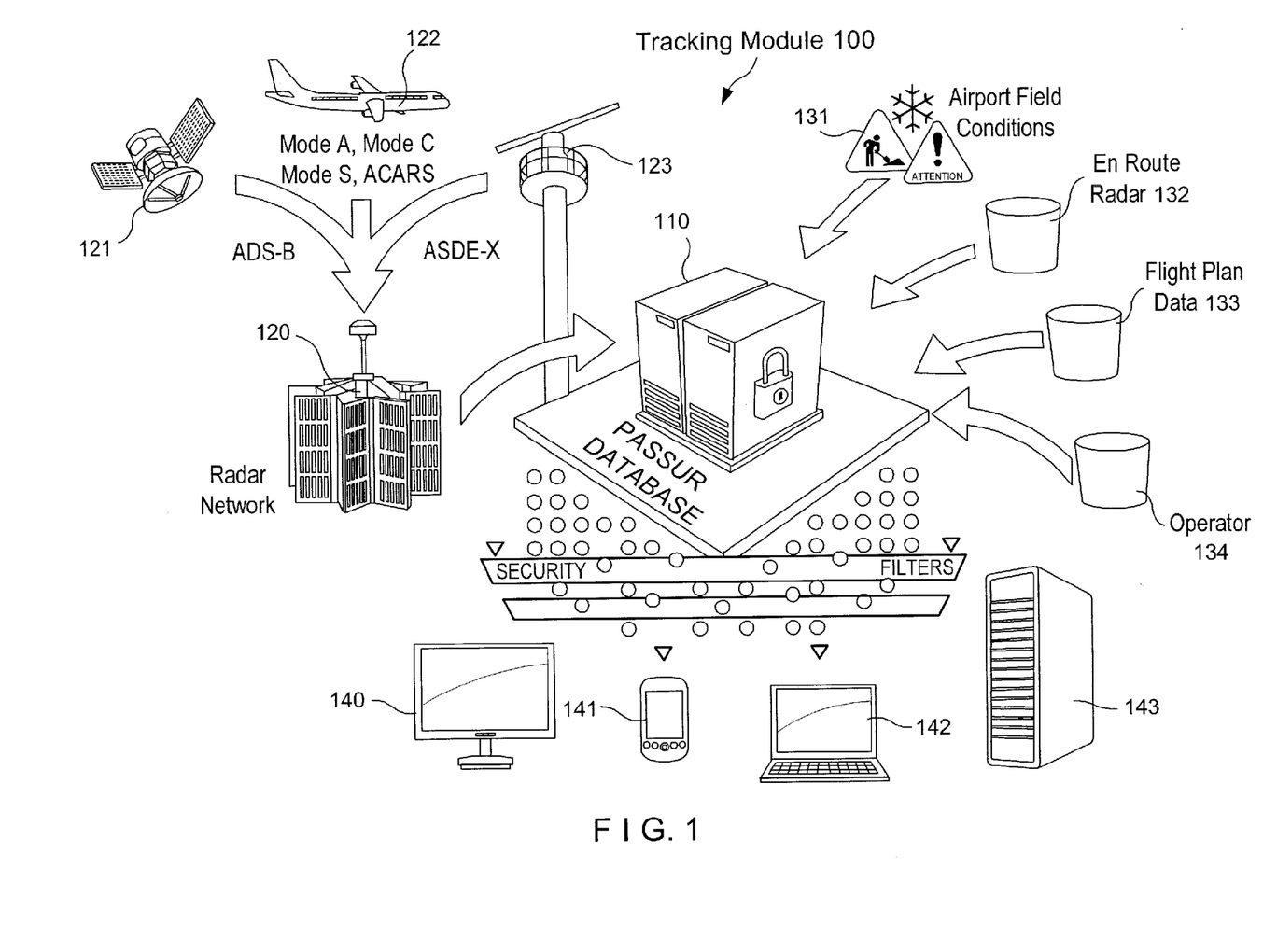
FIG. 1 shows an exemplary tracking module for tracking aircraft, storing aircraft information and identifying patterns within the information according to an exemplary embodiment of the present invention.

FIG. 1 shows an exemplary tracking module 100 for tracking aircraft, storing aircraft information and identifying patterns within the information according to an exemplary embodiment. The tracking module 100 may include database 110 in communication with a radar network 120, aircraft and airport information sources 131-134, as well as any number of computer terminals (e.g., desktops 140, handheld devices 141, laptops 142, servers 143, etc.). It should be noted that the communication between the database 110 and the various other components of the module 100 may be secured communications. In other words, the information transfer to and from the database 110 may be filtered using any number of encryption methods, authentication/verification systems, security protocols, etc.

The database 110 may include comprehensive flight information, such as aircraft tail number, owner, operator, flight number, origin/destination, speed, etc. Using the historical information in conjunction with the real-time flight data of the database 110, the tracking module 100 may be capable of tracking and projecting data such as aircraft identification, commercial flight activity, flight patterns, airport operations, aircraft/airport alerts, as well as information received from to the FAA and Air Traffic Control ("ATC").

The exemplary radar network 120 may include data tracking systems, such as an arrival management system and an air traffic management system. An exemplary arrival management system (or ETA System) may include algorithms for providing accurate arrival predictions, and thus ensuring timely and accurate reporting of detailed aircraft information to entities such as governmental agencies for deployment of interdiction teams. An exemplary air traffic management system may track flights and monitor airspace conditions, as well as provide live airspace surveillance of visual flight rules ("VFR") and instrument flight rules ("IFR"). Those skilled in the art will understand that VFR are a set of regulations which allow a pilot to operate an aircraft in weather conditions generally clear enough to allow the pilot to see where the aircraft is going, and that IFR are regulations and procedures for flying aircraft by referring only to the aircraft instrument panel for navigation.

According to the exemplary embodiments, flight behavior algorithms may be used by the tracking module 100 to detect any deviations from flight plan through comparisons of an actual value and expected value for information such as, but not limited to, altitudes, speed, coordinates, etc. In other words, a predetermined value or threshold may be set for an expected value of the aircraft's flight plan. Once the actual value exceeds this threshold from the expected value, a deviation from flight plan may be detected and a corresponding alert may activated and communicated to any number of computer terminals, such as desktops 140, handheld devices 141, laptops 142, servers 143, etc.

The radar network 120 may monitor flight patterns while tracking VFR and IFR of an aircraft and determine deviation from flight plan data. The determination of deviation from flight plan may be performed continuously, in real-time, in order to provide awareness and reporting of sudden, unexpected deviations from a flight plan for an aircraft of interest. Thus, the radar network 120 has the ability to track the aircraft to a new revised destination in real-time.

Furthermore, the various systems of the exemplary radar network 120 may receive and correlate tracking information from aviation data sets and air traffic monitoring sources, such as, automatic dependent surveillance-broadcast ("ADS-B") components 121, aircraft communications addressing and reporting system ("ACARS") components 122, and airport surface detection equipment ("ASDE-X") components 123. Those skilled in the art will understand that the ADS-B components 121 may provide accurate information and frequent updates to airspace users and controllers, and thus may support improved use of airspace, such as reduced ceiling/visibility restrictions, improved surface surveillance, and enhanced safety, for example through conflict management. An aircraft in communication with the ADS-B components 121 may determine its own position using a global navigation satellite system and then periodically may broadcast this position and other relevant information to potential ground stations and other aircrafts within the system. The ADS-B components may be used over several different data link technologies, including Mode-S Extended Squitter ("1090 ES") operating at 1090 MHz, Universal Access Transceiver ("978 MHz UAT"), and VHF data link ("VDL Mode 4").

Those skilled in the art will understand that the ACARS components 122 may be defined as a digital data-link system for the transmission of short messages between an aircraft and the ground stations via radio or satellite transmission. In addition, those skilled in the art will understand that the ASDE-X components 123 may be defined as a runway-safety tool that enables air traffic controllers to detect potential runway conflicts through providing detailed coverage of vehicle/aircraft movement on runways, taxiways, etc. Specifically, by collecting data from a variety of sources, the ASDE-X components 123 are able to track vehicles and aircraft on airport surfaces and obtain identification information from aircraft transponders.

It should be noted that the radar network 120 is also capable of receiving transponder communications from aircraft, such as Mode A code, Mode C code, Mode S code, etc. Those skilled in the art will understand that depending on the type of interrogation, a transponder may send back a transponder code, or "squawk code" (i.e., Mode A) or altitude information (i.e., Mode C) to help air traffic controllers to identify the aircraft and to maintain separation. Mode S, or Mode Select, code is designed to help avoiding over-interrogation of the transponder (e.g., having many radars in a congested areas) and to allow for automatic collision avoidance.

According to the exemplary embodiments of the tracking module 100, the aircraft/airport information sources 131-134 may include sources relaying airport field conditions 131, en route radar information 132, flight plan data 133, and operator data 134. Therefore, these aircraft/airport information sources 131-134 may allow the tracking module 100 to instantly identify aircraft information (e.g., tail number, owner, operator, aircraft registration and specification data) in order to create a detailed and accurate operator/aircraft profile.

The exemplary computer terminals such as desktops 140, handheld devices 141, laptops 142, servers 143, may include a secure web-enabled dashboard (or portals) in communication with the tracking module 100. Accordingly, users of these computer terminals may link directly with the tracking module 100, and track airport and aircraft operations in real-time. Users such as governmental agencies (e.g., Drug Enforcement Administration, etc.) may be provided with instantaneous messaging and collaboration with the tracking module 100, thereby creating an accurate and efficient operational customer service experience to the user.

Figure 2A:
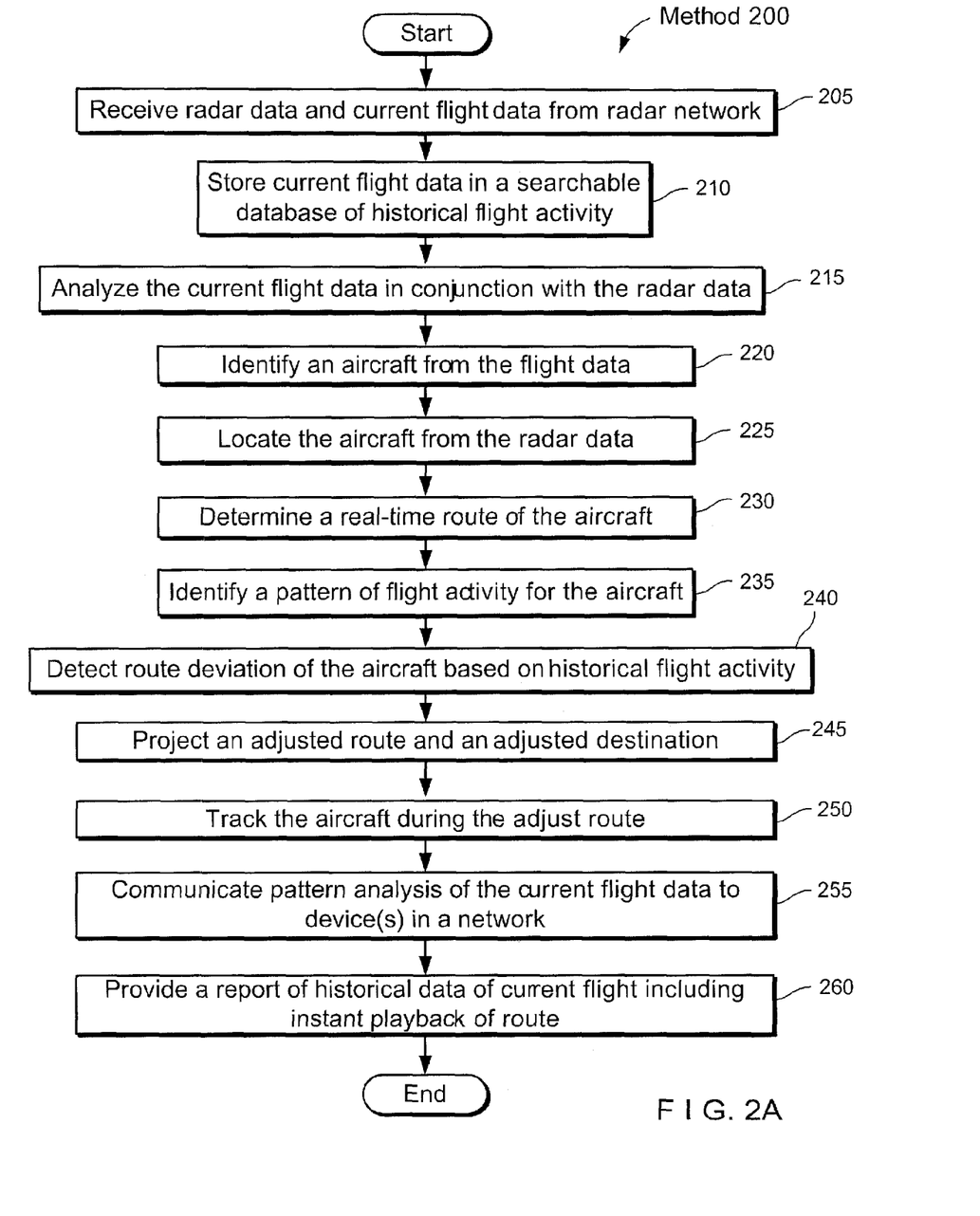
FIG. 2A shows an exemplary method for tracking aircraft, storing aircraft information and identifying patterns within the information according to an exemplary embodiment of the present invention.

FIG. 2A shows an exemplary method 200 for tracking aircraft, storing aircraft information and identifying patterns within the information according to an exemplary embodiment. It should be noted that the steps the exemplary method 200 may be performed by the various components of a flight-tracking module, such as the flight tracking module 100 described in FIG. 1.

It should be noted that the exemplary flight-tracking module performing the steps of method 200 described herein may be incorporated into an existing system. For example, the flight-tracking module may be a web-based communication system, such as a live tracking portal, in which a menu may be presented and an option may be available to access both historical flight information as well as currently tracked flight information. Accordingly, it should be noted that the steps of method 200 may be performed by a processor of a computer system (e.g., a flight tracking processor), wherein the steps are provide to the processor as a set of software instructions stored on a non-transitory computer-readable medium, such as a computer memory.

In step 205 of the method 200, the tracking module 100 may receive radar data and current flight data (e.g., "live" flight data). An integrated radar network, such as the radar network 120 described in FIG. 1, may include an arrival management system for predicting arrival times and an air traffic management system for determining any route deviation from the flight plan data. As will be described in greater detail below, an exemplary radar network may include a plurality of radar installations covering numerous domestic and international airports and terminal airspaces. The radar network may feature the ability to track any aircraft with a working transponder.

In step 210 of the method 200, the tracking module 100 may store current aircraft information for the identified aircraft in the database 110. As noted above, the database 110 may further include stored historical (or archived) aircraft information pertaining to previous flights of the identified aircraft as well as flights of other aircraft. The stored historical aircraft information may detail flight operations history, and thus provide the tracking module 100 with instant reports on past travel history for any and all recorded flights (e.g., commercial flights, air-carrier flights, general aviation flights, etc.). For example, the stored historical aircraft information may include aircraft registration (e.g., "N-number") and radio call-signs correlations. Furthermore, the database 110 may include comprehensive and detailed records of flight activity such as flight plans, actual flights flown, replay of flight tracks and air traffic. Thus, the database 110 may provide flight operation records/city pair flight history.

It should be noted that the historical aircraft data may utilize flight behavior algorithms, wherein radar is processed into flight tracks and air traffic visualizations. These tracks and visualizations may be made immediately available for instant replay of flight information. The algorithms may allow for the tracks and visualizations to maintain precise fidelity of motion, location, and trajectory required for airspace security applications.

In step 215, the tracking module 100 may analyze the radar data and the current aircraft information in conjunction with stored historical aircraft information. This analysis may allow the tracking module 100, in step 220, to identify the aircraft and associated aircraft information from the radar data and the current flight data. According to the exemplary embodiments, the identification of the aircraft may include correlating aircraft information such as tail numbers, owners, operators, pilots, aircraft specification data, with a detailed and accurate aircraft operator profile. Accordingly, the tracking module 100 may provide detailed identification of all aircraft with operating transponders, including General Aviation ("GA") flights. This identification may provide an instant and accurate listing of inbound and departed aircraft, including aircraft-specific details such as tail numbers captured, ownership determined, company travel history by registration and radio call-sign, etc. Thus, the identification of the aircraft performed in step 210 may allow for government agencies (e.g., DEA) to receive aircraft details and registration numbers as quickly as possible.

Furthermore, the analysis performed in step 215 may allow the tracking module 100 to also locate a current position the aircraft in step 225 and determine real-time (or live) route information of the aircraft in step 230. Furthermore, based on the stored historical aircraft data, the tracking module 100 may also identify a pattern of flight activity for the aircraft in step 235. According to the exemplary embodiments of the method 200, the analysis of the tracking module 100 may include precise and refined searches (e.g., "data mining") of the historical aircraft information stored in the database 110. This historical data may include detailed flight history of an individual aircraft, as well as a network of aircraft of coordinated activity. Therefore, the analysis may provide the tracking module 100 with the ability to identify patterns of operation for the individual aircraft and/or network of aircraft.

In step 240, the tracking module 100 may detect route deviations of the aircraft based on the analysis performed in steps 215-235. In other words, the tracking module 100 may compare current aircraft information with historical aircraft information in order to detect and identify any suspect patterns of activity and/or patterns of concern. Therefore, the tracking module 100 may be made immediately aware of any changing flight plans and flight behavior of all monitored aircraft.

In step 245, the tracking module 100 may provide or project an estimated adjusted route and/or destination for the tracked aircraft. The adjusted route and/or destination information may be computed based on the flight analysis performed in step 215 and the detected route deviation performed in step 240.

In step 250, the tracking module 100 may track the aircraft during the adjusted route, and continuously provide updated adjustments to the route based on any further flight path deviation. Real-time images of the tracked route and the projected route may be superimposed over the original flight plan route for visual comparison.

In step 255, the tracking module 100 may communicate the pattern analysis and any detected route deviation to one or more devices on the network, such as computer terminals 140-143. The pattern analysis may be provided to the networked devices in the form of automatically generated alerts and detailed reports, such as a suspect aircraft report. For example, the tracking module 100 may provide an automatically generated alert to the devices in order to notify users of the devices of the detected route deviation. The generated alert may thus readily indicate to the users of the computer terminals 140-143 that an alert is present for one or more currently tracked aircraft. The use of pattern analysis will be described in greater detail in FIG. 2B.

According to one embodiment, the method 200 may provide instant communication to various outlets and terminals via a single web-enabled dashboard (e.g., a web-based tracking portal). This web-enabled dashboard may allow the tracking module 100 to securely coordinate and collaborate with external entities such as governmental agencies (e.g., DEA operatives) in real-time for rapid deployment of resources. The real-time information provided by the tracking module 100 may become available to these external entities with sufficient lead time in order to allow for timely planning and accurate deployment of ground interdiction teams awaiting arrival of inbound aircraft of interest at airfields.

In step 260, the tracking module 100 may provide instant playback of historical aircraft/flight data to the one or more devices on network. It should be noted that this historical aircraft/flight data may be historical data of completed flights (e.g., one-year old data, one-day old data, etc.) as well as historical data of aircraft still in flight (e.g., one-minute old data, one-hour old data, etc.). Accordingly, the comprehensive and detailed records of flight activity history may allow for instant replay playback. The instant replay playback of each selected aircraft may include tail number, owner/operator information, flight plans, actual flights flown, replay of flight track and air traffic, etc. The replay data may be stored in a database (e.g., the database 110) as both visual data and text-based data. The user of the tracking module 100 may adjust the retention parameters of this stored data to any predetermined periods of time (e.g., monthly, annually, etc.). Instant playback of all traffic (including all VFR-transponder equipped aircraft) may allow for immediate response from governmental agencies, as well detailed information for immediate port-incident analysis. Furthermore, this instant playback may allow for instant travel pattern analysis for aircraft (e.g., number of flights, where has this plane been, etc.) and airports (e.g., which aircraft have arrived/departed, destinations of outbound flights, origins of inbound flights, etc.)

Figure 2B:
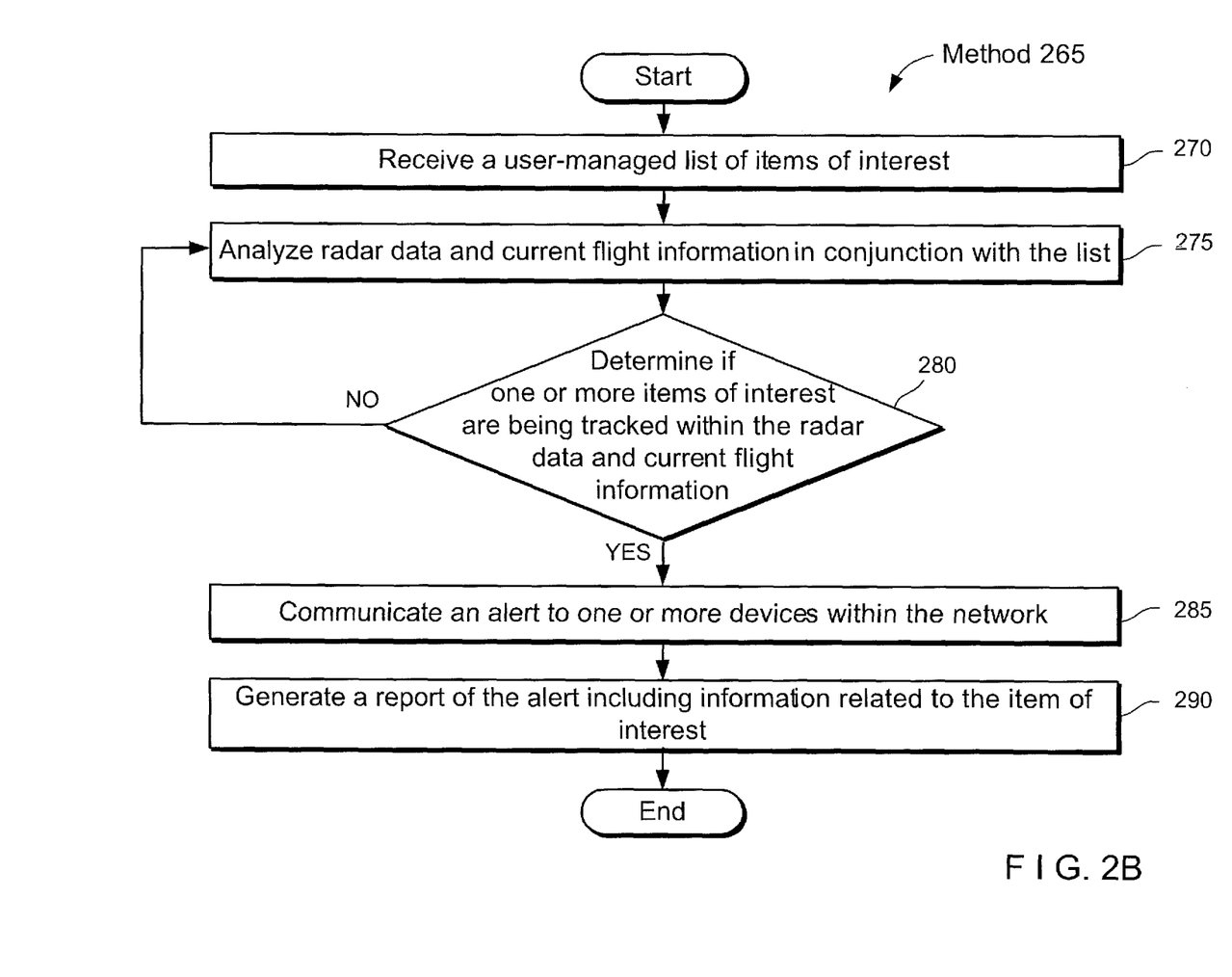
FIG. 2B shows an exemplary method for pattern recognition during aircraft tracking information according to an exemplary embodiment of the present invention.

FIG. 2B shows an exemplary method 265 for pattern recognition during aircraft tracking information according to an exemplary embodiment of the present invention. It should be noted that the steps of the exemplary method 265 may be performed by the various components of a flight-tracking module, such as the flight tracking module 100 described in FIG. 1.

In step 270 of the method 200, the tracking module 100 may receive a user-managed list of items of interest. For instance, this user-managed list may include one or more suspect aircraft or combinations thereof (e.g., aircraft pairings), any number of flight destination and origins or combinations thereof (e.g., city pairings), specific flight plans/routes, etc.

In step 275, the tracking module 100 may analyze radar data and current aircraft information in conjunction with the user-managed list of items of interest. If the item of interest is one or more aircraft, the user-managed list may include a list of aircraft identification information, such as aircraft registration number, tail numbers, etc. If the item of interest is a city pairing, the user-managed list may include specific origin and destination information.

It should be noted that the user-managed list may include any combination of aircraft information, location information, route information, etc. Accordingly, the analysis of the radar data and current aircraft data may allow the tracking module 100 to monitor the data for events involving these items of interest. For example, these events may include receive a flight plan from an aircraft of interest, detecting a takeoff or a landing from aircraft of interest, detecting a mid-flight beacon signal from aircraft of interest, detecting an aircraft of interest in a location of interest, detecting a flight between a city pairing of interest, detecting route information from an aircraft pairing of interest, etc.

In step 280, the tracking module 100 may determine if one or more items of interest from the user-managed list are currently being tracked within the radar data and the current aircraft information. If the tracking module 100 detects an item of interest, the method 265 may advance to step 285. Otherwise, the tracking module 100 may continuous analyze and monitor the radar data and current aircraft information in step 275.

In step 285, the tracking module 100 may the tracking module 100 may communicate an alert to one or more devices on the network, such as computer terminals 140-143. The alert may include any information available for the tracked item of interest. For example, the alert may state that a takeoff of a specific aircraft of interest has been detected in a location of interest. Accordingly, this alert may notify users of the devices of the detected item(s) of interest from the user-managed list.

In step 290, the tracking module 100 may generate a detailed report of the alert and include any information pertaining to the tracked item of interest. For example, the tracking module 100 may provide periodic reports (e.g., daily, weekly, monthly, etc.) of all detected aircraft and/or airport activity related to each of the items of interest listed in the user-managed list.

It is also noted that the flight tracking module 100 is not limited to tracking information based only on the above described user managed list, but it may recognize certain patterns in the data in conjunction with the user managed list or independent of the user managed list. For example, if the user managed list includes the tail number of a suspect aircraft for which the flight tracking module 100 is generating alerts, the flight tracking module may also mine the historical data for this suspect aircraft and determine that another aircraft (not on the user managed list) has landed at the same location within a predetermined time threshold (e.g., two (2) hours) of the suspect aircraft multiple times. This may generate an alert so that the other aircraft may be flagged as a suspect aircraft.

In another example, the flight tracking module 100 may determine that a particular aircraft has flown between the same airports on multiple occasions (whether these airport pairs are included in the user managed list or not) and generate an alert based on this activity. To provide a specific example, it may be that the DEA has information that flights carrying illegal drugs depart from city A and land in city B. The city pair A-B may be on the managed list so that aircraft that make multiple flights between these cities (e.g., 6 times a month) generate an alert. However, it may be that the flight tracking module 100 also determines that there are multiple aircraft flying between city A and city C (even though these cities are not a pair on the managed list). The flight tracking module 100 may generate an alert for the DEA such that an investigation may be launched to determine if a new illegal drug gateway has been opened. The alert may then also be used to populate the user managed list to identify the aircraft that frequently fly the city A-C route.

Figure 3:
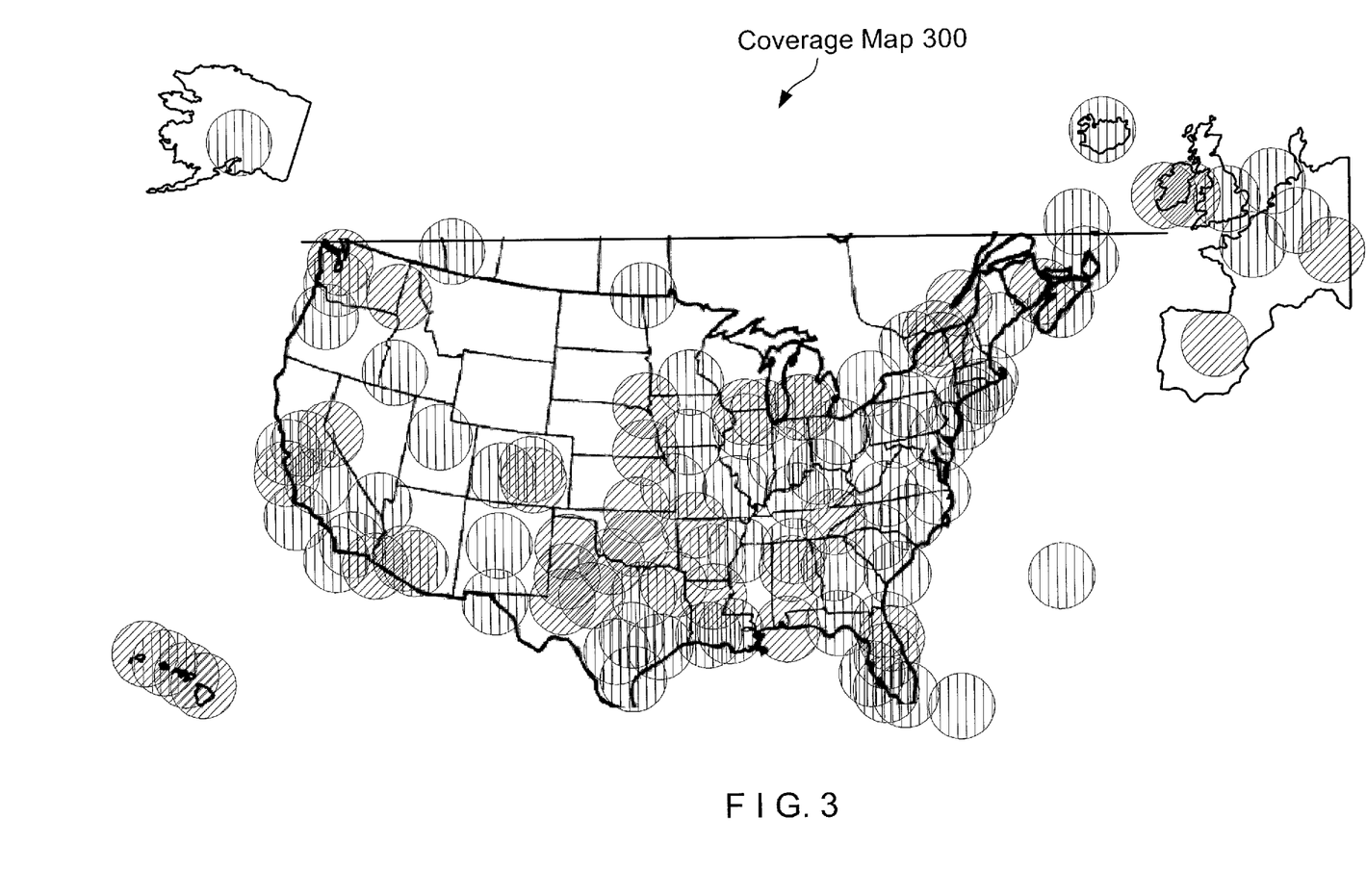
FIG. 3 shows an exemplary coverage map of an integrated radar network, such as radar network of FIG. 1, according to an exemplary embodiment of the present invention.

FIG. 3 shows an exemplary coverage map 300 of an integrated radar network, such as radar network 120 of FIG. 1, according to an exemplary embodiment. The radar network may be integrated in to the exemplary tracking module 100 described above. This radar network may include any number of radar installations and may be expanded to cover any number of domestic and international airports. It should be noted that the radar installation detailed in the coverage map 300 of FIG. 3 merely provide an illustrative example of one radar network, and is in no way intended to limit the coverage or the capabilities of the tracking module 100 according to the present invention.

As noted above, the radar network may independently track any aircraft with a working transponder. The radar network may be integrated with other information sets (e.g., aviation data sets, etc.) to seamlessly monitor and report flight information of any aircraft from takeoff to landing. The information gathered from the radar network may provide continuous real-time positional updates for each monitored aircraft. In addition, the radar system may be securely integrated with comprehensive flight information from an internal network database, such as database 110 of FIG. 1, including aircraft tail number, owner, operator, flight number, origin/destination, speed, etc.

It should be noted that the exemplary embodiments are not limited to traditional radar installations (e.g., active and passive radar), but may include any technology that tracks the actual position of an aircraft. For example, global positioning satellite ("GPS") data is being used more frequently to provide live aircraft position data. This GPS data may not be tracked using a traditional radar installation, but may be signaled to the ground via other technologies. Accordingly, when the exemplary embodiments described the use of radar tracking, this should be understood to encompass any type of live aircraft tracking.

Figure 4:
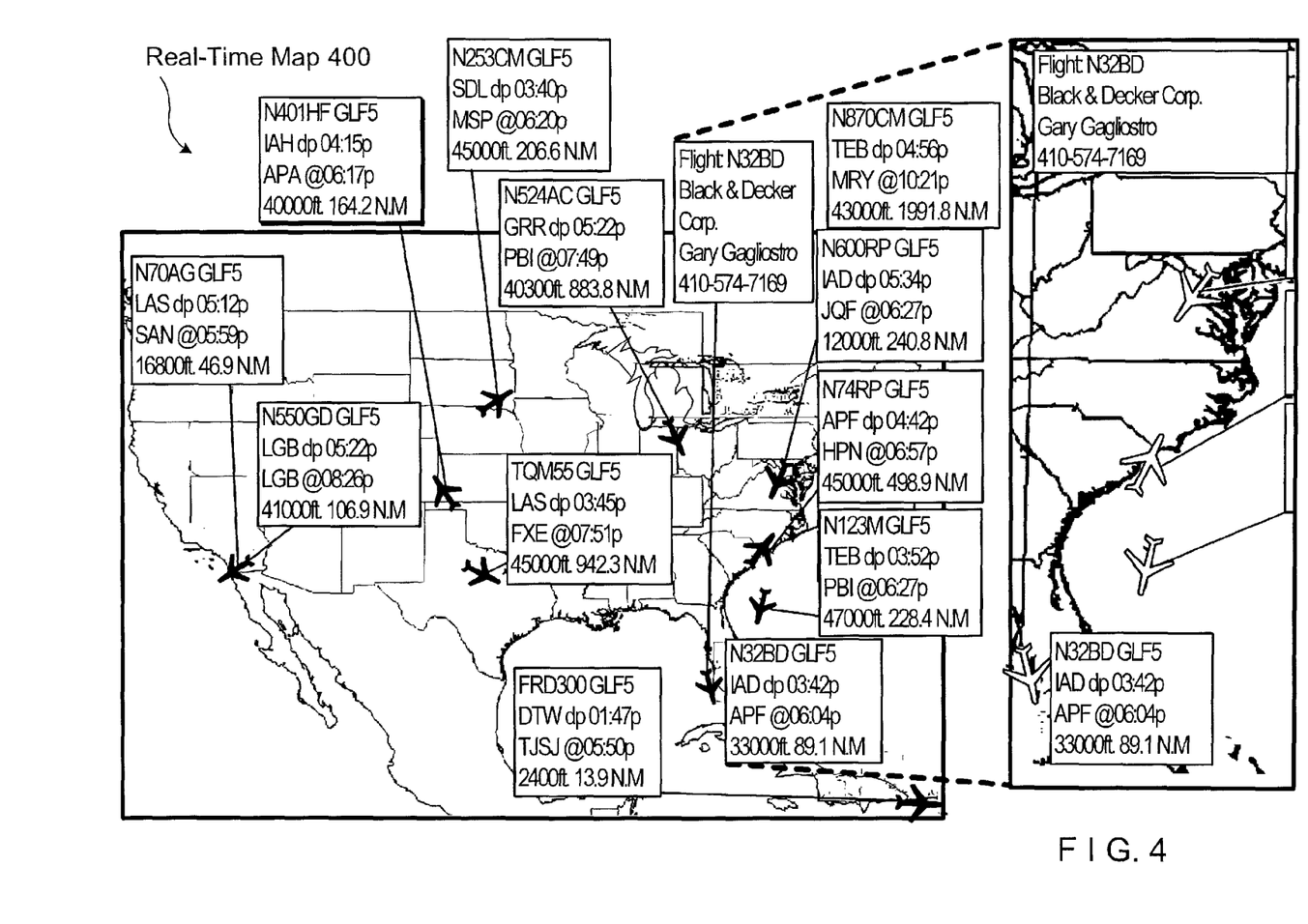
FIG. 4 shows an exemplary real-time map of various airborne aircraft according to an exemplary embodiment of the present invention.

FIG. 4 shows an exemplary real-time map 400 of various airborne aircraft according to an exemplary embodiment. The real-time map 400 may be securely accessible to an external user via a web-based dashboard (e.g., displayed on any of the computer terminals 140-143 described in FIG. 1). The real-time map 400 may be interactive to the user, wherein the user may "click" on an aircraft of interest to receive real-time aircraft and flight information, such as flight number, aircraft owner, operator, origin, destination, ETA, height, speed, bearings, etc.

Figure 5:
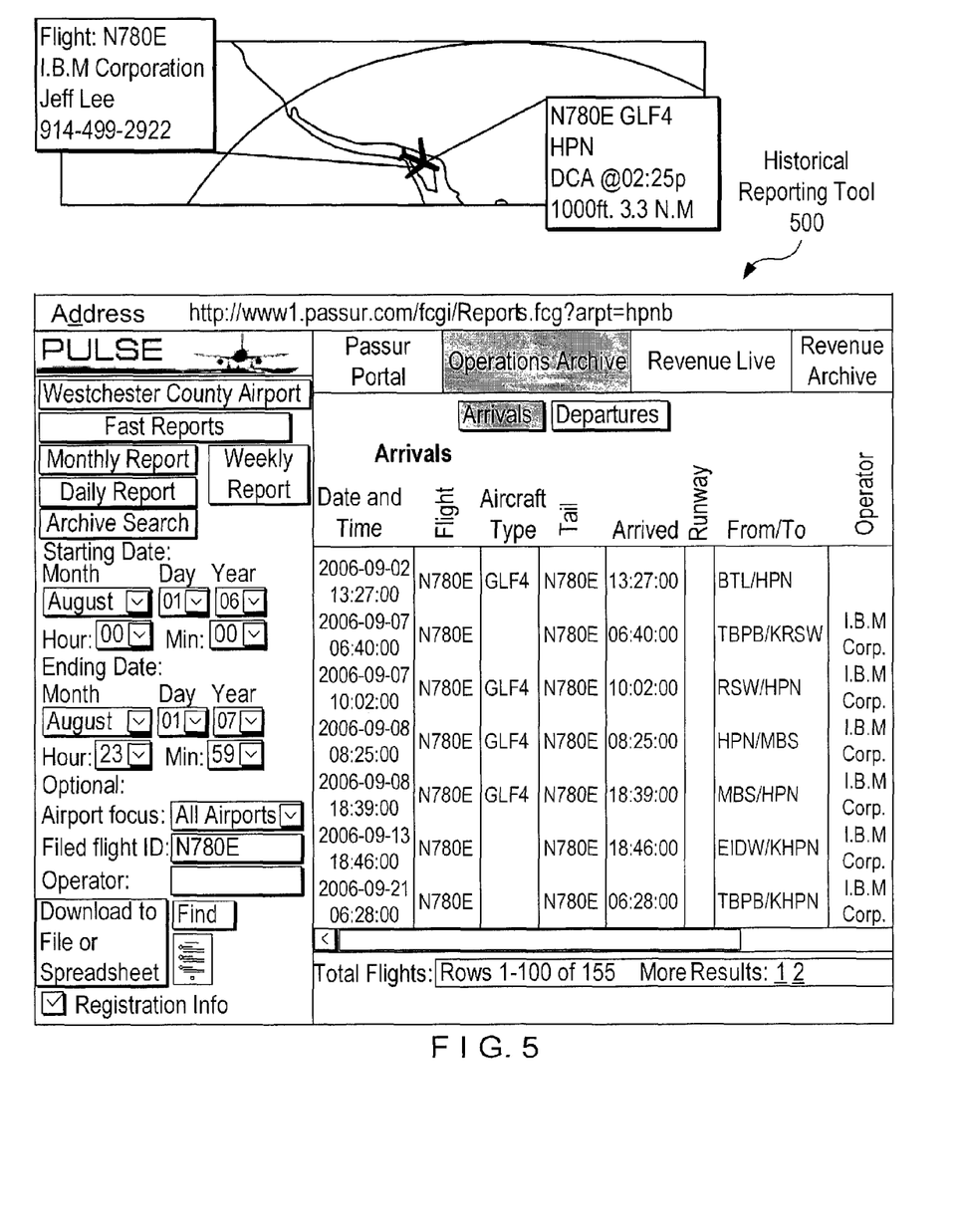
FIG. 5 shows an exemplary historical reporting tool for a selected aircraft according to an exemplary embodiment of the present invention.

FIG. 5 shows an exemplary historical reporting tool 500 for a selected aircraft according to an exemplary embodiment. Similar to the real-time map 400 of FIG. 4, a historical map of the reporting tool 500 may be securely accessible to an external user via a web-based dashboard (e.g., displayed on any of the computer terminals 140-143 described in FIG. 1). It should be noted that the historical reporting tool 500 may be fully user-interactive via the web-based dashboard, wherein the reporting tool 500 may feature any number of selectable tabs, drop-down menus, search fields, report-generating buttons, etc.

According to the exemplary embodiments, the historical reporting tool 500 may provide the user with a detailed listing of the selected aircraft's past travel patterns. This travel pattern information may inform the user of precisely where this aircraft has flown over any set time frame (e.g., over the past year). Accordingly, with a single click via the dashboard, the user may be provided with various historical aircraft data such as number of flights, prior flight dates and times, arrival times, runway information, operator information, origin and destination information, etc. The interactive historical map 500 may provide various find and search fields (e.g., airports, flight identification, operators, etc.) and provide downloadable reports (e.g., detailed daily, weekly, monthly, etc.).

Those skilled in the art will understand that while the above has been described with reference to historical data for an aircraft, it may be that the historical data may be indexed based on other information. For example, the historical data may be indexed based on flight numbers. That is, an exemplary flight number (e.g., UA 300) may have multiple historical records associated with different aircrafts. The point of interest may be the historical data of the particular flight, not of the specific aircraft that is flying that current route.

Figure 6:
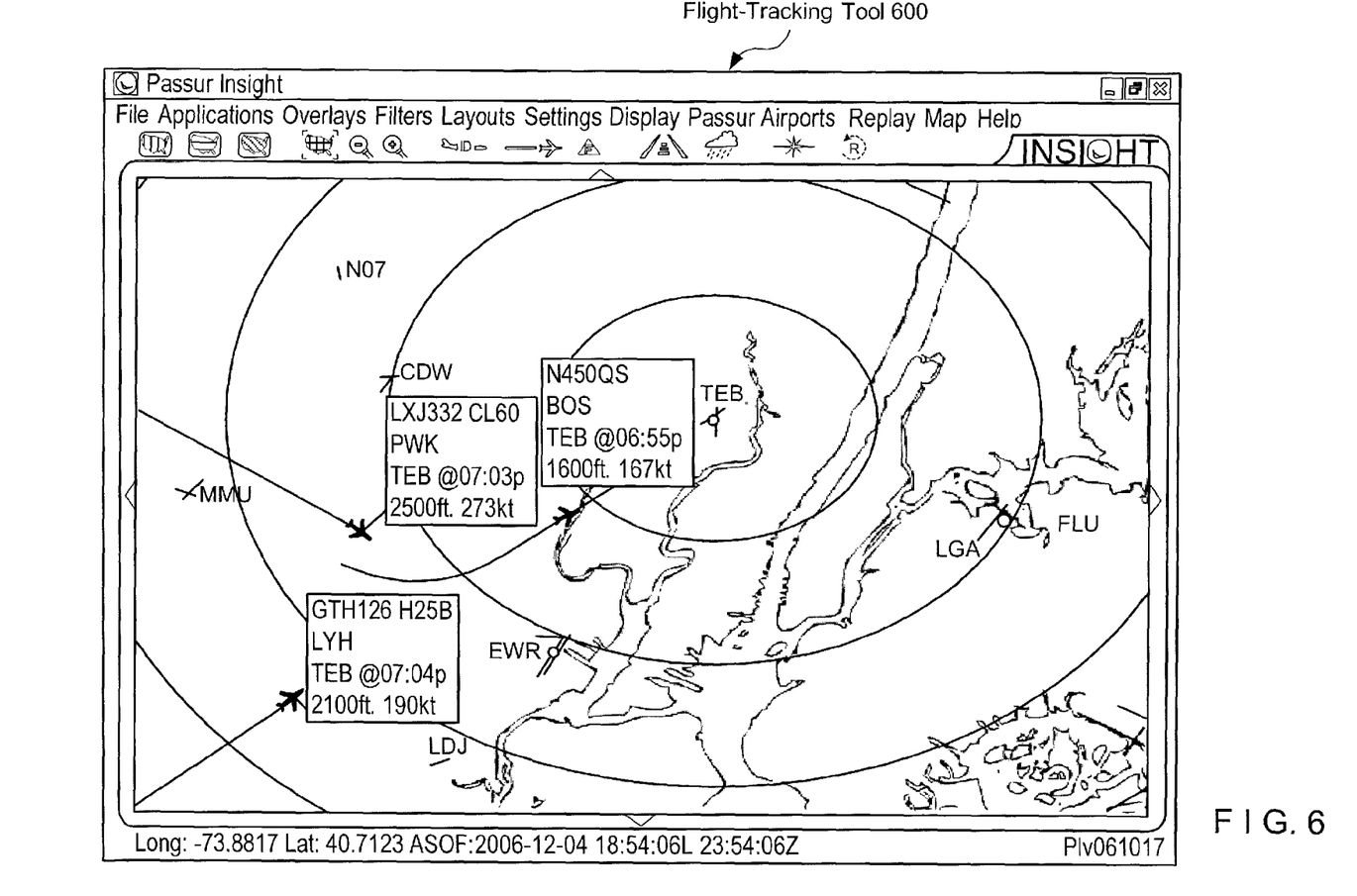
FIG. 6 shows an exemplary flight-tracking tool for a selected aircraft according to an exemplary embodiment of the present invention.

FIG. 6 shows an exemplary flight-tracking tool 600 for a selected aircraft according to an exemplary embodiment of the present invention. Similar to the real-time map 400 of FIG. 4, a fight-tracking map of the flight-tracking tool 600 may be securely accessible to an external user via a web-based dashboard (e.g., displayed on any of the computer terminals 140-143 described in FIG. 1). In other words, the flight-tracking tool 600 may highlight information such as real-time continuous takeoff-to-landing flight tracking via the dashboard. The flight-tracking tool 600 may be automatically engaged with the radar network described above while the flight is within a terminal area. The flight-tracking tool 600 may include all the data collected by the track module 100, such as from the arrival management system, the air traffic management system, airport condition reporting system, weather reporting systems, etc.

Figure 7:
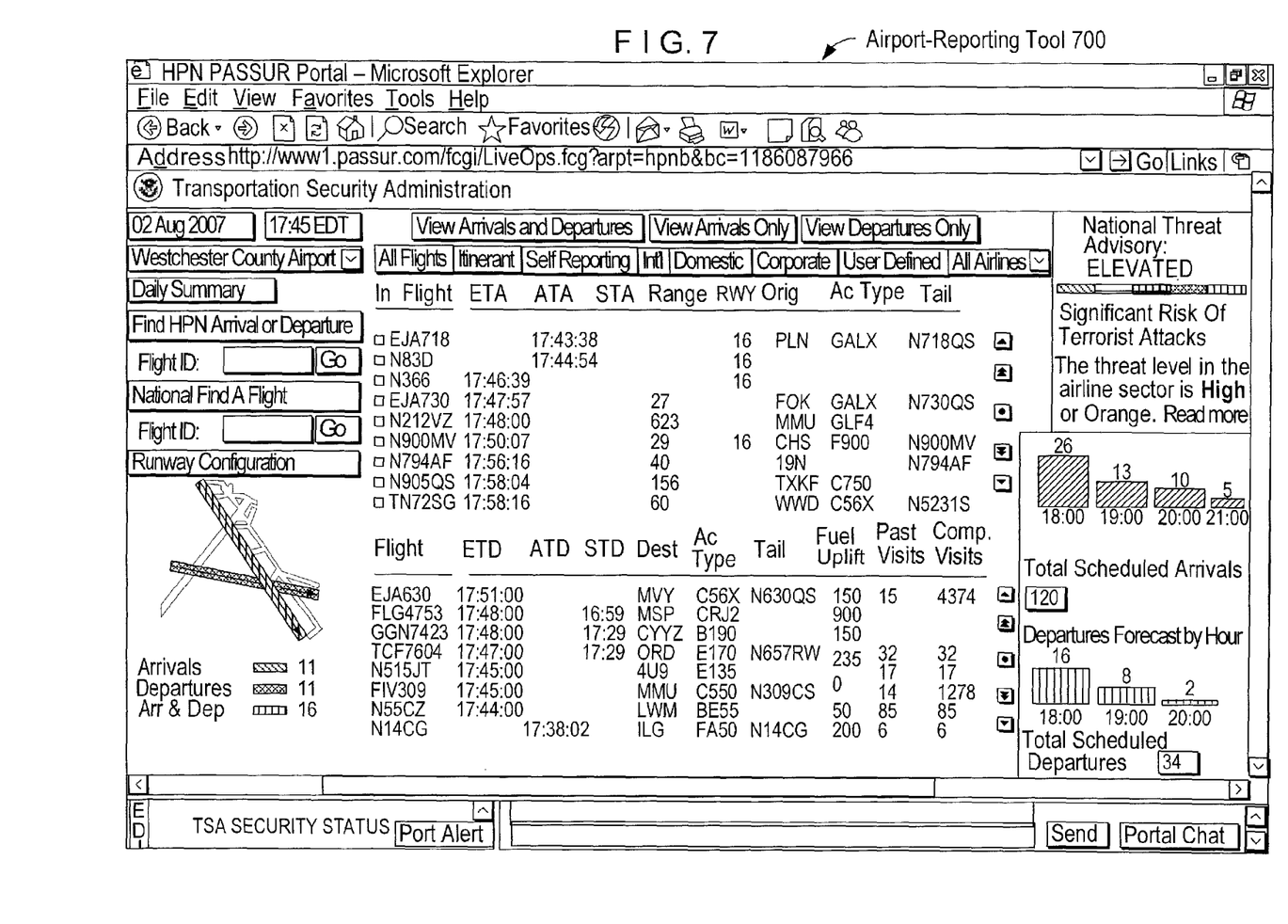
FIG. 7 shows an exemplary live airport-reporting portal for a selected airport according to an exemplary embodiment of the present invention.

FIG. 7 shows an exemplary live airport-reporting portal 700 for a selected airport according to an exemplary embodiment of the present invention. Similar to the real-time map 400 of FIG. 4, the airport portal 700 may be securely accessible to an external user via a web-based dashboard (e.g., displayed on any of the computer terminals 140-143 described in FIG. 1). It should be noted that the airport portal 700 may be fully user-interactive via the web-based dashboard, wherein the airport portal 700 may feature any number of selectable tabs, drop-down menus, search fields, report and summary-generating buttons, etc.

The searchable and reportable information may include, but is not limited to, airport selection, arrival and departure listings, flight numbers, estimated arrival and departure times, adjusted arrival and departure times, range, runway, origin, destination, aircraft type, tail numbers, etc. The airport portal 700 may also provide additional relevant information such as National Threat Advisory details, total number of scheduled flights, departures and arrivals forecasted by hour, etc. The live airport portal 700 may be configured according to a user preference. The above-described data that is presented may be expanded or contracted as a function of the user's preference. For example, additional data may be shown if the user prefers to include this additional data such as aircraft type, a weather update, estimated location, etc.

The exemplary embodiments provide real-time tracking of details and alerts associated with aircraft of interest (e.g., suspect aircraft). The information provided by the exemplary flight tracking module 100 may enable an airport and its personnel to enhance the interdiction success rate of suspect aircraft through accurate arrival prediction, precise aircraft location, instant route deviation detection, complete capture of any data related to the suspect aircraft, and the ability to discern suspect patterns of activity that may have otherwise been undetected and/or undetectable.

The web-based dashboard of the exemplary tracking module 100 may be easily implemented in existing systems to further incorporate the above described advantages for real-time information gathering and alerting of passengers/airport personnel as well as providing back data of alerts to prepare for future anticipated alerts.

Those skilled in the art will understand that the above-described exemplary embodiments may be implemented in any number of manners, including as a separate software module, as a combination of hardware and software, etc. For example, the exemplary flight tracking module may be a program containing lines of code that, when compiled, may be executed on a processor. Specifically, the tracking module may be a program of a server for a network in which data relating to tracking aircrafts is stored in a database of the network.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a location network determining location data of an aircraft;
   a searchable database storing historical flight activity data, current flight data, and the location data from the location network, wherein the historical flight activity data comprises data corresponding to historical flight activity of the aircraft, data corresponding to historical flight activity of a current route of the aircraft, and data corresponding to historical flight activity of at least one suspect aircraft;
   a flight tracking processor receiving location data and the current flight data of the aircraft from the database, analyzing the location data and current flight data using flight behavior algorithms, detecting a route deviation of the aircraft based on the historical flight activity data, wherein the detecting the route deviation comprises identifying a deviation between flight data for a current route and flight data for an expected route;
   the flight tracking processor determining a projected flight path of the aircraft based on the detected route deviation, and based on the analyzed location data and current flight data, generating a report of flight pattern analysis and the detected route deviation to at least one device on a network, wherein the report of flight pattern analysis includes an immediate visualization of real-time images of the projected flight path of the aircraft superimposed over the expected route; and
   an alert module transmitting an alert to a third party,
      when the deviation exceeds a predetermined threshold that corresponds to an expected value of the flight data for the expected route, and
      when a pattern is detected wherein the historical flight activity of the aircraft matches historical flight activity of one of the at least one suspect aircraft within predetermined thresholds of time and location coincidences.

2. The system of claim 1, wherein analyzing the location data and current flight data by the flight tracking processor includes:
   searching the database of historical flight activity data;
   identifying an aircraft based on the location data and current flight data;
   locating the identified aircraft based on the location data;
   determine the current route of the aircraft based on the location data; and
   identify a flight pattern for the aircraft based on the determined current route and the historical flight activity data.

3. The system of claim 1, wherein the flight tracking processor further projects an adjusted destination of the aircraft based on analysis of the location data and current flight data and tracks the aircraft during the projected flight path.

4. The system of claim 1, wherein the alert module further transmits an alert to a third party when the historical flight activity of the aircraft indicates that the aircraft has flown a route between two cities outside a predetermined threshold of frequency, wherein the route between two cities is on a user-managed list of suspect routes.

5. The system of claim 1, wherein the location data from the location network includes at least one of aircraft communication reporting, aviation transponder activity, and airport surface detection information.

6. The system of claim 1, wherein the current flight data of an aircraft includes at least one of aircraft registration information, aircraft tail number, aircraft owner, aircraft operator, flight number, flight origin, flight destination, flight plan data, en route radar, flight speed, flight altitude, and flight bearings.

7. The system of claim 1, wherein the historical flight activity data includes information pertaining to flights previous to the current flight.

8. The system of claim 1, wherein the at least one device on the network is provided with instant playback of the historical flight activity data.

9. A non-transitory computer readable storage medium including a set of instructions operable to, when executed by a processor, enable the processor to implement a method comprising:
   receiving location data and current flight data of an aircraft from a location network;
   analyzing the location data and current flight data using flight behavior algorithms;
   detecting a route deviation of the aircraft, wherein the detecting the route deviation comprises identifying a deviation between flight data for a current route and flight data for an expected route;
   determining a projected flight path of the aircraft based on the detected route deviation and based on the analyzed location data and current flight data;
   generating a report of flight pattern analysis and the detected route deviation to at least one device on a network, wherein generating the report of flight pattern analysis includes generating an immediate visualization of real-time images of the projected flight path of the aircraft superimposed over the expected route; and
   transmitting an alert to a third party,
      when the deviation exceeds a predetermined threshold that corresponds to an expected value of the flight data for the expected route, and
      when a pattern is detected wherein historical flight activity of the aircraft matches historical flight activity of a suspect aircraft within predetermined thresholds of time and location coincidences.

10. The computer readable storage medium of claim 9, wherein the set of instructions operable to, when executed by the processor, enable the processor to implement the method further comprising:
    storing the current flight data on a searchable database of flight activity history.

11. The computer readable storage medium of claim 9, wherein analyzing the location data and current flight data includes:
    searching a database of flight activity for historical flight data;
    identifying an aircraft based on the location data and current flight data;
    locating the identified aircraft based on the location data;
    determine the current route of the aircraft based on the location data; and
    identify a flight pattern for the aircraft based on the determined current route and the historical flight data.

12. The computer readable storage medium of claim 11, wherein the historical flight data includes information pertaining to flights previous to the current flight.

13. The computer readable storage medium of claim 11, wherein the at least one device on the network is provided instant playback of the historical flight activity data.

14. The computer readable storage medium of claim 11, wherein the set of instructions operable to, when executed by the processor, enable the processor to implement the method further comprising:

transmitting an alert to a third party when the historical flight activity of the aircraft indicates that the aircraft has flown a route between two cities outside a predetermined threshold of frequency, wherein the route between two cities is on a user-managed list of suspect routes.

15. The computer readable storage medium of claim 9, wherein the set of instructions operable to, when executed by the processor, enable the processor to implement the method further comprising:

projecting an adjusted destination of the aircraft based on analysis of the location data and current flight data; and tracking the aircraft during the projected flight path.

16. The computer readable storage medium of claim 9, wherein the location data includes at least one of aircraft communication reporting, aviation transponder activity, and airport surface detection information.

17. The computer readable storage medium of claim 9, wherein the current flight data of an aircraft includes at least one of aircraft registration information, aircraft tail number, aircraft owner, aircraft operator, flight number, flight origin, flight destination, flight plan data, en route location, flight speed, flight altitude, and flight bearings.

* * * * *